TIME DELAY UNIT

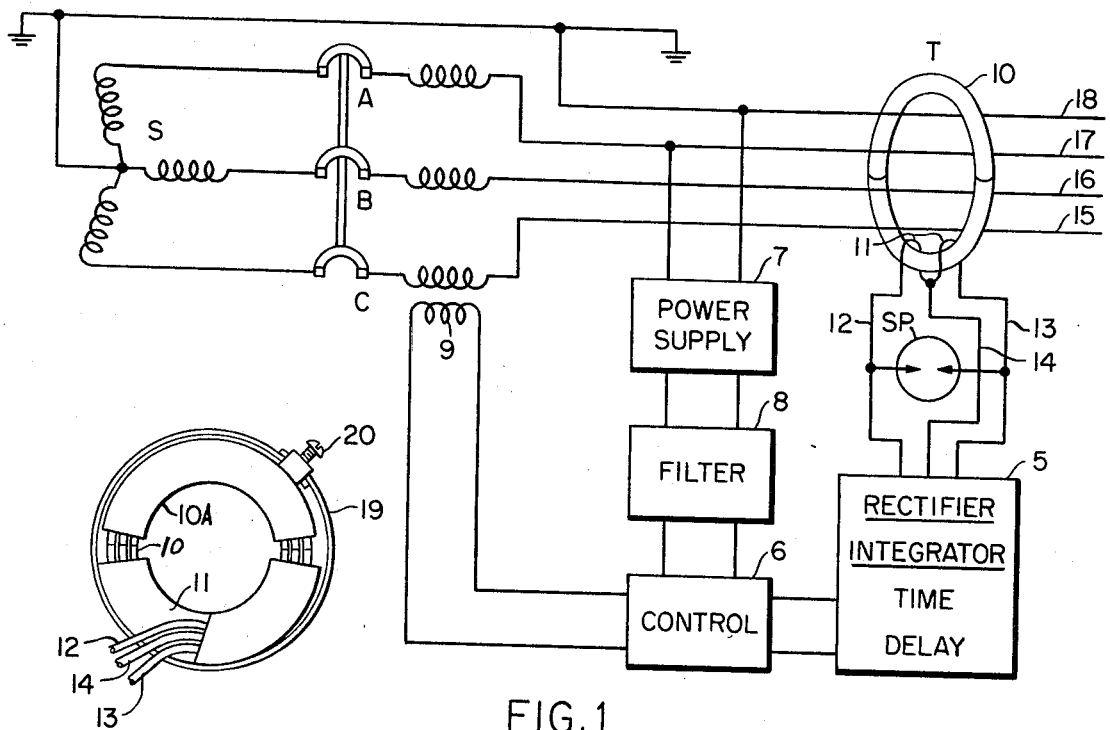
FIG. 2
FIG. 1
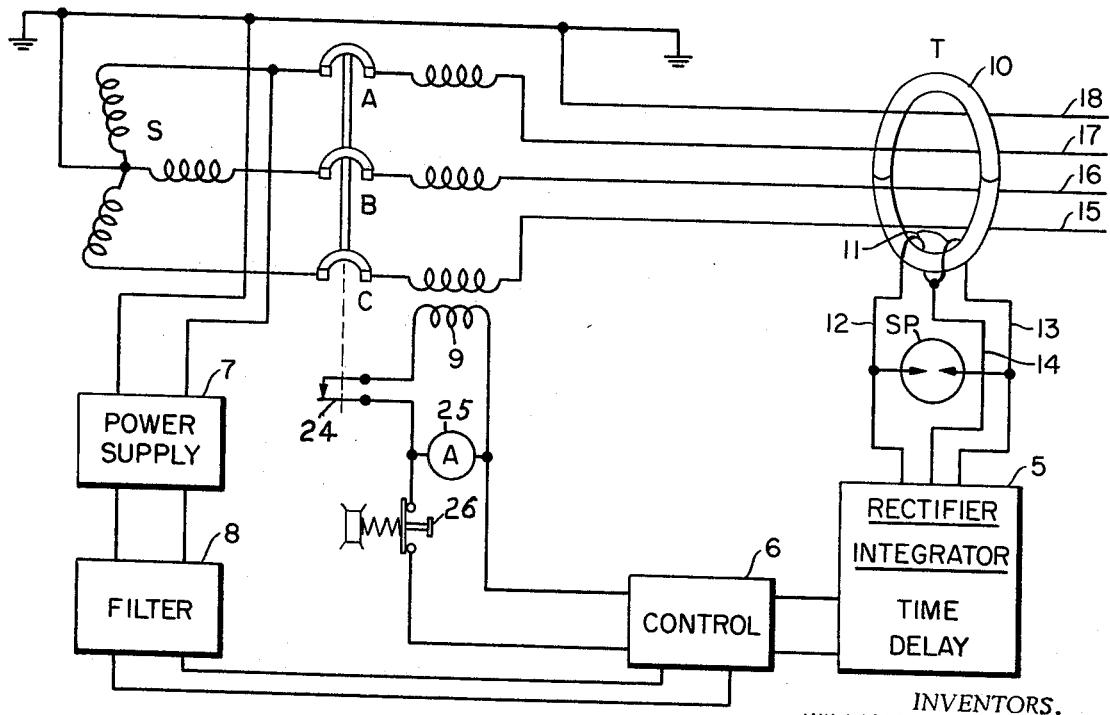
FIG. 3
INVENTORS.
WILLIAM C. TIPTON
ROBERT A. PHILIBERT
DAVID M. SANGER
BY Forest B. Hitchcock
their ATTORNEY

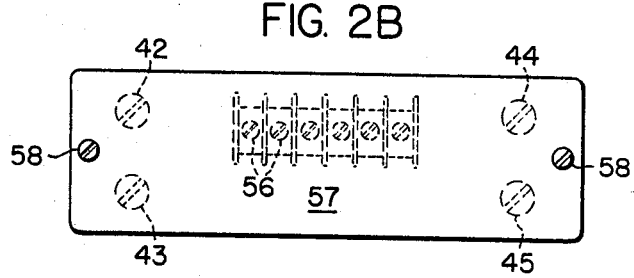
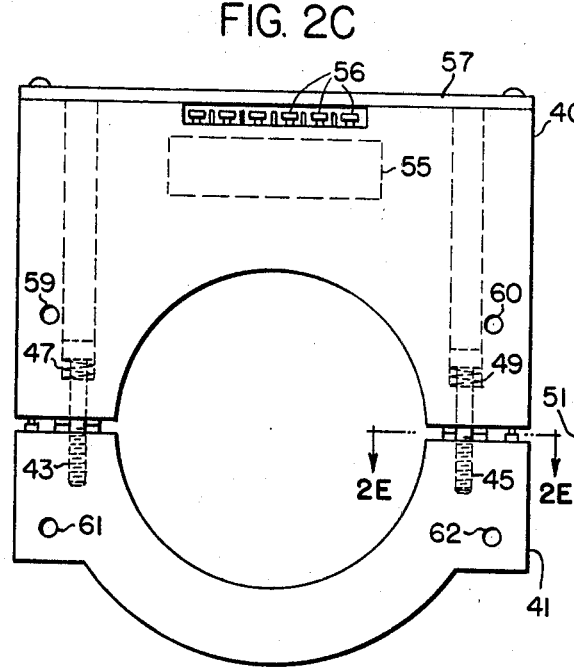
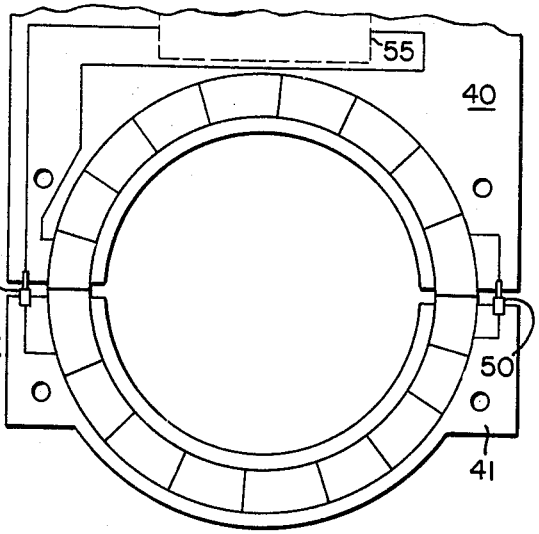
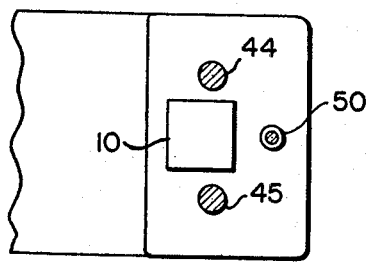

INVENTORS
WILLIAM C. TIPTON
ROBERT A. PHILIBERT
DAVID M. SANGER

BY Forest B. Hitchcock
THEIR ATTORNEY

United States Patent Office 3,512,045
Patented May 12, 1970

3,512,045
GROUND FAULT RESPONSIVE APPARATUS FOR ELECTRIC POWER DISTRIBUTION APPARATUS
William C. Tipton, Newark, N.J., Robert A. Philibert, Rockville Centre, N.Y., and David M. Sanger, Livingston, N.J., assignors to The General Signal Corporation, and O. Z. Electrical Manufacturing Co., Inc., both of New York, N.Y., and both corporations of New York
Continuation-in-part of application Ser. No. 597,086, Nov. 25, 1966. This application June 28, 1968, Ser. No. 743,268
Int. Cl. H02h 3/28, 1/04
U.S. Cl. 317—18
17 Claims

ABSTRACT OF THE DISCLOSURE

This ground fault protection apparatus responds to ground fault currents from phase to ground in electrical distribution apparatus. The response of such apparatus causes the power source to be disconnected from the phase wires until the fault has been removed and it is considered safe to again connect the source. This apparatus is protected from erroneous tripping in response to line transients, and the apparatus is inherently protected against catastrophic self-destruction in the event of excessively high fault currents. One form shows a self-powered unit receiving energy from the same transformer as supplies the measure of fault current. Another form shows a time-delay unit suitable for use with a plurality of other similar units to open the most remote circuit section having a fault without opening proceeding circuit sections.

Cross references to related applications

This application is a continuation-in-part of our prior application, Ser. No. 597,086, filed Nov. 25, 1966, now abandoned, in which certain specific improvements were disclosed over the prior application of R. A. Philibert et al., Ser. No 533,733, filed Mar. 11, 1966, now Pat. No. 3,419,756, dated Dec. 31, 1968.

Background of the invention

This invention relates to ground fault protection apparatus and electric power distribution apparatus and, more particularly, relates to such apparatus protected from erroneous tripping in response to power supply transients, load transients, large steady state or surge loads; and loads in associated circuit conductors in proximity to the apparatus. The apparatus is also protected against self-destruction from high fault current.

In said prior system, Ser. No. 533,733, a fault detecting core structure of relatively low permeability characteristics was used to protect the apparatus from the induction of high voltages during high fault currents; but, such core also caused the apparatus to be less sensitive to the low fault currents. In addition, the connections of such prior fault detection apparatus to the normally available power sources would repeat transient pulses from such sources which would tend to erroneously trip the protective apparatus unnecessarily.

The improvement of Ser. No. 597,086 (basis for this case), obviated the shortcomings above mentioned and provided a highly efficient fault detecting apparatus which is protected against the induction of high voltages during the occurrence of high fault currents.

Some prior art disclosures, such as the patent to Dalzell, Pat. No. 3,213,321, dated Oct. 19, 1965, show a system which is highly sensitive to a ground or a short circuit so as to trip the circuit breaker upon the occurrence of a relatively small current. This is to avoid a fatality in the event a person becomes a part of such short circuit. The present invention is related to commercial installations where various minor and unimportant unbalances occur within the circuit during usual operations; but the fault detector will open the circuit in the event of an unbalance which would cause a fire or other dangerous condition.

SUMMARY

The fault detector of the present invention applicable to alternating current circuits comprises a magnetic core structure surrounding an electrical conductor capable of carrying a fault current. A winding is located on the core structure which has an output dependent upon the magnetic flux in the core, which output is rectified and supplied to circuit means which requires such an output to reach a preselected voltage for causing such means to indicate a control indicative of a fault current. A surge protector is connected across the terminal of the winding on the core. This surge protector is normally nonconductive but becomes conductive to constitute a low impedance connected across the winding. This change in the surge protector occurs when the value of voltage across the winding becomes substantially above the value required to produce said preselected voltage across said circuit means to cause it to indicate the presence of a fault.

The electrical fault detector of this invention is applicable to alternating current circuits having an electrical conductor capable of carrying a fault current. A toroid transformer means is connected around the conductor to produce a voltage in the winding of the transformer proportional to the flux produced therein by the presence of a fault current. A rectifying integrating circuit means is connected to the output terminals of the winding on the transformer for supplying output voltages above a preselected value upon the occurrence of a fault current above a preselected value in the conductor. A silicon controlled rectifier has its control electrode and cathode connected to receive the output of the rectifying integrating circuit means for the purpose of being tripped by its voltage output when it rises to a preselected value. An alternating current supply is connected through a rectifier for supplying a direct current voltage across the anode and cathode of the silicon controlled rectifier and through a winding of a fault indicating device. The tripping of the silicon controlled rectifier then allows current to flow through the fault indicating device. However, a bypass capacitor is connected across the anode and cathode of said silicon controlled rectifier to allow any transient voltages received from said alternating current source to bypass said silicon controlled rectifier.

An electrical fault detector according to this invention provides a toroid transformer surrounding an electrical conductor capable of carrying a fault current. This transformer includes two independent windings one for detecting the presence of a fault current and the other for providing a separate source of alternating voltage. A silicon controlled rectifier has its control electrode and cathode connected to one of said windings to receive voltages at or above a preselected value of fault current with said silicon controlled rectifier being tripped when such a voltage is received. An additional rectifier circuit means is connected to the second winding of said toroid transformer for supplying a direct current across the anode and cathode of said silicon controlled rectifier and through a fault indicating device. Such circuit means includes a capacitor connected across the output of said rectifier circuit means so that the charge on said capacitor will accumulate during the presence of a fault current through the conductor and be effectively discharged through said fault indicating device when said silicon controlled rectifier is tripped.

The invention in another form includes two silicon controlled rectifiers, the first of which is supplied with a tripping voltage when there is a fault current present in an electrical conductor. The tripping of the first silicon controlled rectifier initiates a timing action which continues for a predetermined time for then rendering the second silicon controlled rectifier effective for discharging a capacitor through a circuit breaker trip mechanism.

Other objects, purposes and characteristic features of the present invention will be in part obvious from the accompanying drawings, and in part pointed out as the description of the invention progresses.

Brief description of the drawings

In describing the invention in detail, reference will be made to the accompanying drawings, in which like reference characters designate corresponding parts throughout the several views, and in which:

FIG. 1 is a block diagram illustrating the fault detecting apparatus associated with a three phase neutral grounded power supply;

FIG. 2 is a diagrammatic side structural view of the form of toroid detector employed in FIG. 1;

FIGS. 2B, 2C, 2D and 2E show different views of a toroid detector and related electronic apparatus encased by plastic with a split constructed to provide proper magnetic contact between the two halves of a core;

FIG. 3 is a block diagram similar to FIG. 1 but showing the power supply connected on the power side of the circuit breaker;

Figure 4:
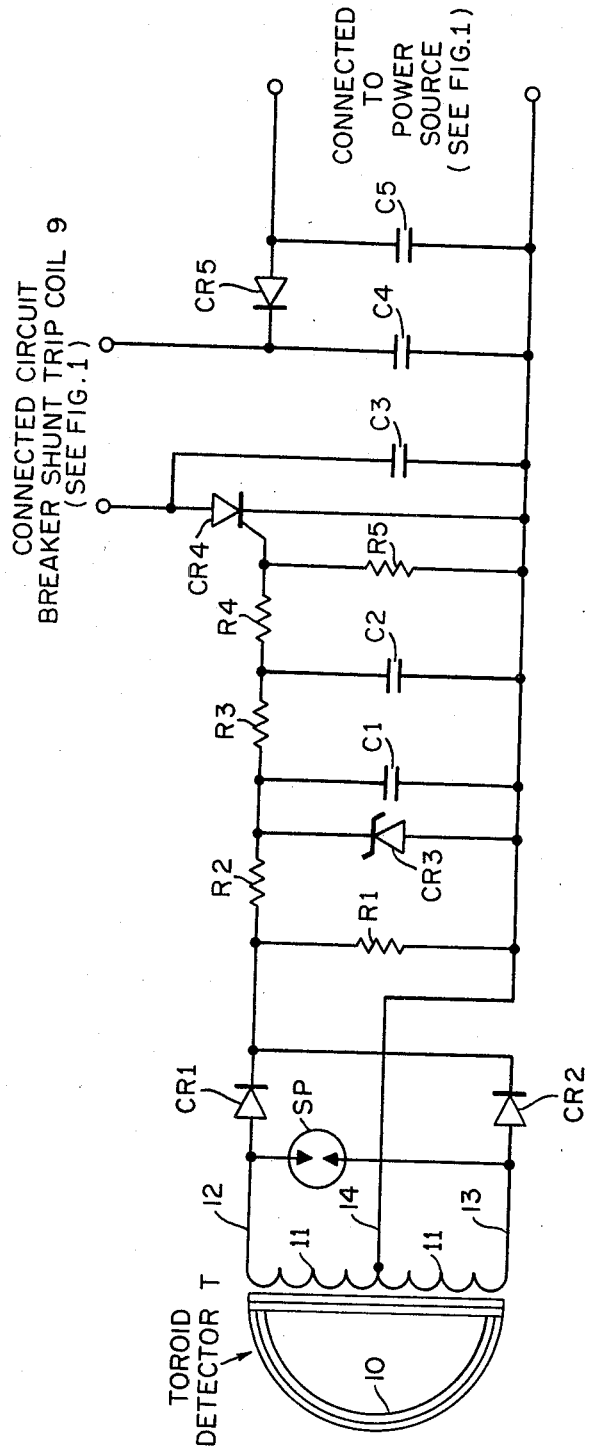
FIG. 4 shows a circuit diagram organized to effect the proper functioning of the apparatus shown diagrammatically in FIGS. 1 and 3.

For the purpose of simplifying the illustration and facilitating the explanation, the various parts and circuits constituting the embodiment of the invention have been shown diagrammatically and certain conventional illustrations have been employed. The drawings have been made with the purpose in mind of making it easy to understand the principles and mode of operation of the invention.

Description of preferred embodiments

The preferred embodiments of the invention provide fault responsive apparatus which is protected against the induction of high voltages and is immune to transients in the power source circuitry such as, for example, when fluorescent lamps are turned on and off.

The invention proposes to employ a detecting device using a toroid core of a laminated type which surrounds the circuitry that may carry the fault current. This laminated toroid has a medium value permeability. It is therefore fairly responsive to all fault currents, both high and low, and yet tends to prevent extreme voltages from being induced in its windings. However, upon the occurrence of relatively high fault currents, the voltages which are produced in the windings of the toroid may be substantially beyond the values which can be tolerated by the solid state electronic devices. It is for this reason that a protective device in the form of a gas-filled over-voltage protector is connected across the winding on the toroid. This gas-filled protective device ionizes when it discharges and thus acts as a low impedance shunt across the winding, which would thus directly and immediately reduce the voltage output of the winding; and thus prevent catastrophic destruction of the devices used in the detector structure.

The transient voltages of spike shape and short duration are rendered ineffective by using capacitors of sufficient size to absorb such spike voltages. Such capacitors are used in a filtering network with resistors so as to create an inherent time delay of an appropriate order, such as a fraction of one cycle to about three cycles of the alternating current, depending upon the type of service and conditions being monitored. Such very short inherent time interval still allows the apparatus to be fully responsive under those conditions to which it is desired that such apparatus will respond in order to protect the apparatus with which it is associated against values of fault current which would create fires and the like.

In addition, one of the forms of the present invention is a self-powered unit, so-called, because the power which renders the fault detector effective to disconnect the source from the fault is obtained from the detector core itself by the addition of another winding together with a rectifier and charging capacitor which will store sufficient energy during the time just preceding the occurrence of a fault of substantial value to effect the response to the circuit breaker.

In another form, a time-delay unit is provided which can be readily changed to measure a number of different times. When a plurality of these time-delay units are used with a plurality of serially connected circuits, the more remote units are given shorter times while the units closer to the power supply are given longer times. Thus, the most remote unit detecting a fault current opens the power circuit for its section and the fault is removed without the removal of power from the near sections. This type of fault detecting unit uses a steady source of energy.

With reference to FIG. 1, a three-phase Y-connected source S is shown having a center tap connected to ground and to a ground or neutral wire leading to the local distribution box where it is again grounded. The three phases are fed through the usual circuit breaker CBK having main breaker contacts A, B and C. From the breaker CBK the three phases are connected through series trip coils and thence to the load circuits over conductors 15, 16 and 17. The grounded or neutral wire 18 also continues with the three phase wires 15, 16 and 17, and is sometimes connected to the load circuits.

Associated with the apparatus just described is the fault detection apparatus provided in accordance with the present invention. This apparatus includes a toroid transformer and detector organization T which is illustrated as surrounding the phase and ground or neutral wires. The output of this transformer T is connected to a rectifier, an integrator and time delay circuit organization 5 which connects to the control apparatus 6. The control apparatus 6 is supplied with power from the above mentioned source S through a rectifying power supply 7 and filter 8. When the apparatus detects a grounded current, i.e. a current flowing through the phase and ground or neutral wires to the load but not returning thereby, the control apparatus 6 acts to supply energy to the shunt trip winding 9 of the circuit breaker and causes the tripping thereof. This of course immediately removes the power from the phase wires leading to the load, and disconnects energy from the power supply 7 and detector T. The ground fault detecting apparatus is thus restored to normal in readiness to detect another ground fault when the circuit breaker is again closed.

Also, connected across the output windings of the toroid transformer T is a surge dissipating device SP which acts under conditions later described to prevent high voltages from being applied to the integrator and inherent time delay circuit organization 5.

The above fault detection organization is commonly known as a "zero sequencing" type of detection where normally the currents in the phase and ground wires balance each other except when a ground current flows. Such ground current is assumed to return via some other path such as a conduit or the like and thus the currents passing over the phase and ground or neutral wires do not cancel each other. Although this particular form is shown in the illustration of FIG. 1, it is to be understood that the toroid transformer T can detect currents in a separate ground current carrying conductor or jumper such as shown and described in the above mentioned prior application Ser. No. 533,733.

The mechanical structure of the toroid transformer T is illustrated in FIG. 2. Its core 10 is formed by winding a strip of .012 inch thick steel tape on a mandrel until the cross sectional area of the core is approximately one-half inch square. The doughnut shaped core thus formed can of course be of any suitable diameter and cross section. Once such doughnut shaped core 10 is formed, its convolutions are held in position by a suitable cement or plastic coating. The doughnut shaped core 10 is then cut into two halves one of which has the windings 11 wound thereon which windings have two end output wires as well as a center tap output wire. The other half may have a protective covering 10A around it, or it may be wholly self-sufficient with its cement or plastic coating. These three wires 12, 13 and 14 are shown as leading to the integrator and time delay 5 in FIG. 1 which has circuitry shown in greater detail in FIG. 4.

This doughnut shaped toroid core 10 can then be readily placed around open insulated conductors 15, 16, 17 and 18 as shown in FIG. 1, or around any suitable conductor or strap that may be included in the circuitry in such a way that it will carry fault current, if any such ground fault current occurs. Once the two halves of the toroid core 10 are located around the conductors or a single strap conductor, they are then held in position tightly against each other by a suitable clamp 19 (see FIG. 2). This clamp 19 can be of the type which draws in tighter as the screw 20 is tightened, or it can be of the holding type once it has been tightly positioned. Although this clamp is effective to hold the two halves of the toroid core 10 together, the contact between the two halves inherently includes a minimal air gap due to the lack of continuity in the steel convolutions when they have been cut. This further reduces the permeability of the core. In any event, one source of material known as Selectron Steel can be obtained from the Arnold Engineering Company, Marengo, Ill. The particular core here used is obtained by ordering Part No. 2551. The core thus formed, as above described, is of a medium range permeability.

The clamp member 19 above mentioned is of suitable common steel or suitable non-magnetic material which can hold the two halves of the core 10 tightly together. In either case, the holding clamp surrounds the outer portion of the windings 11 on the core 10 and thus has little or no effect on its magnetic characteristics.

With reference to FIG. 4, the toroid transformer T produces an output on the terminals of its windings dependent upon the next current flowing through its primary conductors. As above mentioned, the current in the conductors in FIG. 1 would normally vectorially balance so that the normal net value would be zero; but a ground current returning by some other path might well occur increasing to a value at which the apparatus would cause a tripping operation of the circuit breaker. The apparatus used in the laboratory for sensing fault ground currents was set to trip upon the occurence of a twenty ampere fault current, but the apparatus may be set to trip upon the occurrence of a fault ranging from one to several hundred amperes as desired.

The transformer windings have a voltage across their output terminals proportional to the fault current which is supplied to the rectifier units CR1 and CR2 in a center tap circuit organization connected across the resistor R1.

The voltage appearing across R1 is presented to a resistance-capacitance integrating network including resistor R2, capacitor C1, resistor R3, capacitor C2, resistor R4, and resistor R5. The voltage which appears across the resistor R5 is used as a driving voltage for the silicon controlled rectifier CR4 which is tripped when such voltage rises above a predetermined value. Upon the occurrence of such a voltage the silicon controlled rectifier CR4 becomes conductive and causes the shunt circuit breaker trip coil 9 to be energized from the direct current supplied from the power supply 7 of FIG. 1.

Such power supply 7 comprises a connection to one phase of the power source which is in the order of 115 volts. It is to be understood that any suitable power supply can be used and that any suitable voltage can be selected. This source connected to the power supply terminals of FIG. 4 is rectified by rectifier CR5 the output of which is filtered by the capacitor C4. This direct current is then fed to the load circuit and the silicon controlled rectifier CR4. The capacitor C4 supplies filtering action so that the anode of the silicon controlled rectifier CR4 receives a relatively ripple-free direct current voltage when it is nonconductive. Such voltage is also sufficiently smooth that the anode current of CR4 never falls below its holding level, i.e. the level required to maintain CR4 conductive, when CR4 is once triggered. This insures the continuous conduction of CR4 once it has been triggered.

However, when loads are applied or removed from the load circuits being protected, pulses of relatively high value may transiently appear on the phase connected to power supply 7. For example, the application or removal of a fluorescent light may produce pulses ranging as high as 600 volts. These transient pulses although rather high are of short or spiked duration. For this reason the capacitors C5 and C3 are used to reduce the effect of such pulses. Capacitor C5, for example, tends to absorb such pulses, but some of their value may reach the load circuit so that the capacitor C3 is used to bypass such pulses past the silicon controlled rectifier CR4 and avoid tripping it.

When the usual power supply of DC voltage is applied to the silicon controlled rectifier CR4 it, of course, does not trip and the capacitor C3 is normally charged to that voltage; but when a short pulse of a higher transient voltage is received such capacitor C3 quickly absorbs such pulse rather than allowing it to trip the silicon controlled rectifier CR4.

Under normal operating conditions there is either no voltage induced in the winding of the toroid core or if there is a voltage induced it is below the voltage which will trigger the silicon controlled rectifier CR4. However, when the voltage rises to a tripping value which is determined by the selection of the value of resistor R2, such voltage is then fed to the integrating circuitry and after a short time dependent upon the resistance-capacitance characteristics thereof, such voltage reaches its value above the triggering value required for silicon controlled rectifier CR4 and causes it to be conductive. However, the Zener diode CR3 tends to hold such voltage to a value not higher than a preselected value greater than the particular value required to trip the silicon controlled rectifier CR4. Thus, if the fault currents induce voltages above the preselected value, the Zener diode CR3 tends to stabilize such tripping voltage. The diode CR3 used in the laboratory was a twelve volt one watt zener diode. As previously noted, the output voltage from transformer T is limited, under severe overload conditions, by SP to values of between 150 and 200 volts. The size and cost of the capacitive elements of the integrating network would be inordinately large, in relation to their function, if they were required to withstand voltages of these magnitudes. The voltage at the inpjut of the integrating network is limited by the Zener diode CR3 to a value slightly above that required for operation of the circuit including silicon controlled rectifier CR4.

It should be noted, however, that the voltages induced in the windings of the toroid are proportional to the currents flowing in the primary conductors. Should this current reach some fairly high value, beyond the triggering level, the core of the toroid begins to saturate and to limit the power available from its windings. However, during such period of saturation the reversal of the flux in the core may well cause spikes of real high voltage from the transformer which, if applied to the apparatus would cause its damage. To eliminate these spikes as well as the occurrence of any other transients which might be of high value during the delay incurred by the integrating circuits, the gas filled surge protector SP is connected across the outer terminals of the windings 11 mounted on the core 10. During normal operation when no faults or ground current is present and during the time that ground faults are at or near the operating range of the fult detector, the gas filled surge arrestor SP is non-conductive and represents an open circuit condition. However, when the ground current flow is such that it is dangerously high or has high current spikes, voltages are produced which exceed the predetermined breakdown level of the detector, these voltages cause the gas filled surge device to become conductive and prevent a very low impedance load across the windings of the transformer T. One value of this breakdown voltage of SP may be in the range of 150 to 200 volts which is sufficient to protect the apparatus when connected as shown. However, it is to be understod that other breakdown voltages for SP may be selected if the circuit configuration or values selected are changed.

It can be seen that the ground fault current may well include arcs which cause such ground current to be irregular and produce pulses of almost any shape, polarity or phase and any or all of these may vary as functions of time or severity of arcing, and for this reason the integrating circuitry is highly desirable. However, as previously pointed out, any of these transient high pulses need to be prevented from flowing to the circuitry and for this reason the gas filled surge arrester fulfills a most useful purpose.

Although it is well known that Thyrite non-linear resistor may be used to limit the undue rise of voltages in circuitry, such resistors do not have a sharp break in their characteristics so as to become totally ineffective for shunting the output during the occurrence of low levels of voltages. In this particular application the gas tube SP serves to allow voltages within the detecting level to take place and acts to bypass the high voltages only when they become a nonuseful and objectionable value. Also, unlike Thyrite non-linear resistors, the gas tube is a non-dissipative device when operated below its breakdown voltage. It does not, therefore, add objectionable heat to the component enclosure when, in a standby mode of operation, continuous ground currents below the trip level of the detector may occur.

One embodiment of the present invention employed components with the following values:

R1—500 ohms
R2 to be selected
R3—220 ohms
R4—220 ohms
R5—47 ohms
C1—100 mfd.
C2—100 mfd.
C3—.1 mfd.
C4—10 mfd.
C5—.01 mfd.

For the detector which trips at 20 amperes of fault ground current, the transformer T1 provides an output voltage of 18 volts end to end for such value of ground current. The induced voltage is applied to the input of the integrating network. When the pulses have been integrated, a voltage of .55 volt is present across resistor R5 and is effective to trigger the silicon controlled rectifier CR4. The gas surge protector SP is manufactured by the Electrons Company Division of General Signal Corporation, Newark, N.J. The particular protector is known as Device 2416 and breaks down at 150–160 volts.

In FIG. 1 the fault detector is shown as only controlling a shunt trip coil. When the circuit breaker opens, contact A removes energy from the power supply 7 which in turn removes energy from the silicon controlled rectifier unit CR4. This removes energy from the shunt trip coil 9. All apparatus is then in a condition for the restoration of the circuit breaker to a closed position.

It may well be desired to not only trip the circuit breaker but to also leave an alarm indication which requires acknowledgement. This is shown in FIG. 3 where the alarm 25 is connected across the circuit extending to the trip coil 9. In this form of FIG. 3, the energy is connected directly to the power supply 7 from the power source outside of the control of the circuit breaker CBK. This means that, when the circuit breaker CBK opens, energy is still supplied to the silicon controlled rectifier CR4, which continues to be conductive and allows the flow of current to the alarm 25, although energy is removed from the trip coil 9 by reason of the opening of contact 24 interlocked with the operation of the circuit breaker CBK. This auxiliary contact 24 is suitably operated by a mechanical connection to the circuit breaker tripping apparatus.

However, so long as current is flowing through the silicon controlled rectifier CR4, it continues to remain conductive although there is no fault current being detected by the toroid transformer T. Thus, restoration of the system to normal and the stopping of the alarm 25 requires the manual actuation of spring biased push button 26. This temporary opening of the circuit for CR4 allows it to restore to a normally nonconductive condition, so that when the contacts of the push button 26 reclose, energy is no longer supplied to the alarm 25.

In other respects the apparatus of FIG. 3 is considered to be the same as the apparatus of FIG. 1 since the same circuit control of FIG. 4 is employed.

Figure 5:
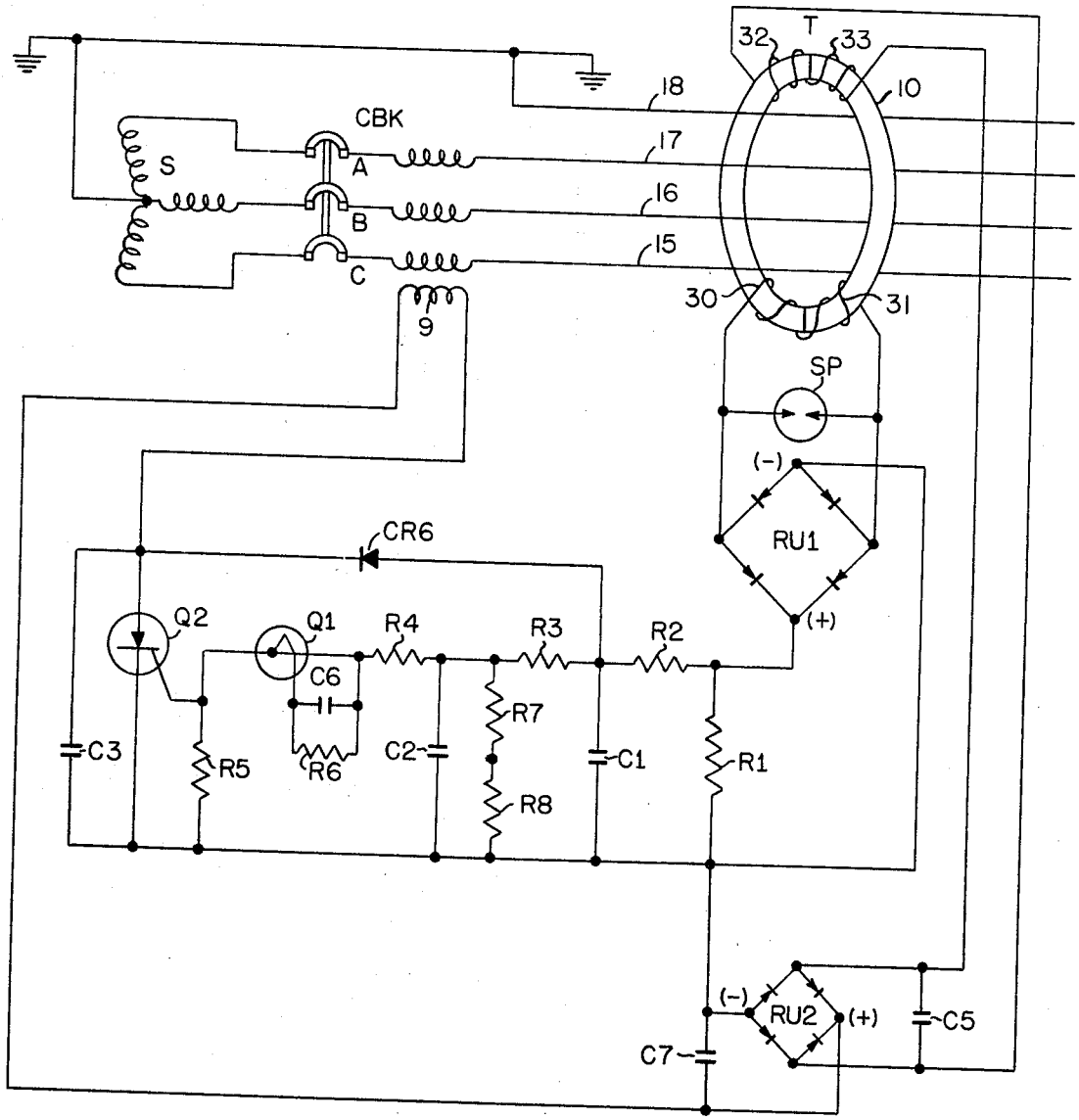
FIG. 5 shows a circuit diagram of a self-powered unit organized to operate wholly from the fault detector transformer.

With reference to FIG. 5, the same source S and circuit breaker CBK is associated with line wires 15, 16, 17 and 18. However, transformer T has four windings on the split core 10. Two of these windings 30 and 31 are connected in series to supply energy to the rectifier unit RU1 whenever there is a net flux in the core 10 due to a non-returning ground fault current flowing in the conductors 15, 16 and 17.

In a similar way, the windings 32 and 33 are connected in series to supply energy to the rectifier unit RU2 whenever there is a net flux in the core 10 due to a non-returning ground fault current flowing through conductors 15, 16 and 17.

It is noted that the splits in the core 10 are in vertical positions and the windings 30 and 31 are shown on opposite sides of the lower split and in a similar manner the windings 32 and 33 are shown on opposite sides of the upper split. In other words, half of the windings for supplying energy to the two rectifier units are on opposite sides of the splits. This reduces the effect of direct pick up by the windings so that the conductors 15, 16, 17 and 18 can be located in any position in the toroid and the ground current in any conductor will have substantially the same effect on the detector organization. This arrangement of the windings also minimizes the direct winding pick up effect from associated conductors outside of the toroid.

The split toroid with core 10 can be constructed as previously explained in connection with FIG. 2 or it can be constructed as later explained in connection with FIGS. 2B, 2C, 2D and 2E.

The energy supplied to the rectifier unit RU1 is rectified and connected to the filtering network in the same manner as previously described. This filtering network is somewhat similar to FIG. 4. However, the Zener diode CR3 of FIG. 4 is omitted and a silicon unilateral switch Q1 (see FIG. 5) is inserted in the lead to the control electrode for the silicon-controlled rectifier Q2. This silicon unilateral switch Q1 includes characteristics similar to a Zener diode in that it fires at substantially a particular voltage and once fired the voltage across it drops to a low value but it continues to conduct until such voltage is removed. In the control lead of this silicon unilateral switch is a capacitor C6 and a resistor R6 in multiple to stabilize the voltage at which this unilateral switch becomes conductive. This switch characteristic is to become conductive at approximately eight volts. Once the silicon unilateral switch Q2 becomes conductive it supplies current to the resistance R5 to provide a proper voltage drop to the control electrode of the silicon-controlled rectifier Q2 and of a sufficient value to cause Q2 to become immediately and abruptly conductive. This allows the charge on the C7 to be discharged through the trip winding 9 and effect the tripping of the circuit breaker CBK. Also, the positive energy which is applied through R2 to the diode, or rectifier unit CR6, can also flow through the silicon-controlled reactor Q2. This shunts or bypasses the filter circuits and control for Q1 and Q2 which in effect removes the voltage across Q1 and allows it to restore. To restore the Q2 it is then necessary to substantially remove the current from its anode. This will be apparent shortly.

During the time that the circuit breaker CBK is closed and energy flows in the conductors 15, 16, 17 and 18 there may be a slight unbalance in the currents and these will induce a net flux in the core 10 which in turn induces a voltage output in the windings 32 and 33 across the rectifier unit RU2. Any voltage which appears on RU2 will put a charge on the capacitor C7. Also, if an undue fault current, or unbalanced condition occurs in the conductors 15, 16, 17 and 18, it is assumed that such current will provide an increased output in the windings 32 and 33 which will increase the charge across the capacitor C7. Thus, when the voltage output of the rectifier unit RU1 becomes sufficient to cause the tripping of Q2 the capacitor C7 then has a sufficient charge so that it will be discharged through the trip winding 9 with a sufficient amount of current to cause the operation of the circuit breaker CBK. Such operation of the circuit breaker of course trips it and opens contacts A, B, and C which entirely removes the current from the conductors 15, 16, 17 and 18 and causes voltage output of the windings on core 10 to be reduced to zero. Thus, the fault detecting apparatus is then effectively restored to normal by the removal of energy from the anode of Q2. The apparatus remains in such position until circuit breaker CBK is restored either manually or by suitable automatic means.

The device SP has the same function as shown in the previously described figures, i.e., ot remove any unduly high voltages which may be induced in the windings 30 and 31. It also noted that anf sharp peak voltages which may occur in the windings and passed by the rectifier unit RU1 through resistor R2 and diode CR6 are bypassed by the capacitor C3 to negative (—). Also, capacitor C3 additionally allows any peak voltages which may be applied across the silicon controlled rectifier Q2 from the source of rectifier supply RU2 to be bypassed to negative bus (—). Incidentally, the capacitor C5 tends to reduce any sharp peaks applied to the input to the rectifier unit RU2 similar to the function of the capacitor C5 of FIG. 4.

In addition, the resistors R7 and R8 connected in series are supplied with a suitable resistance to properly match the characteristic firing point of the silicon unilateral switch Q1.

Thus, a self-powered fault detecting unit has been shown organized in a way so that no additional power connections need to be made. Actually the circuit breaker trip coil 9 can be replaced with other warning devices such as a gong, a lamp, or other means, so as to display to an attendant that there is a fault current in a particular line circuit.

Figure 6:
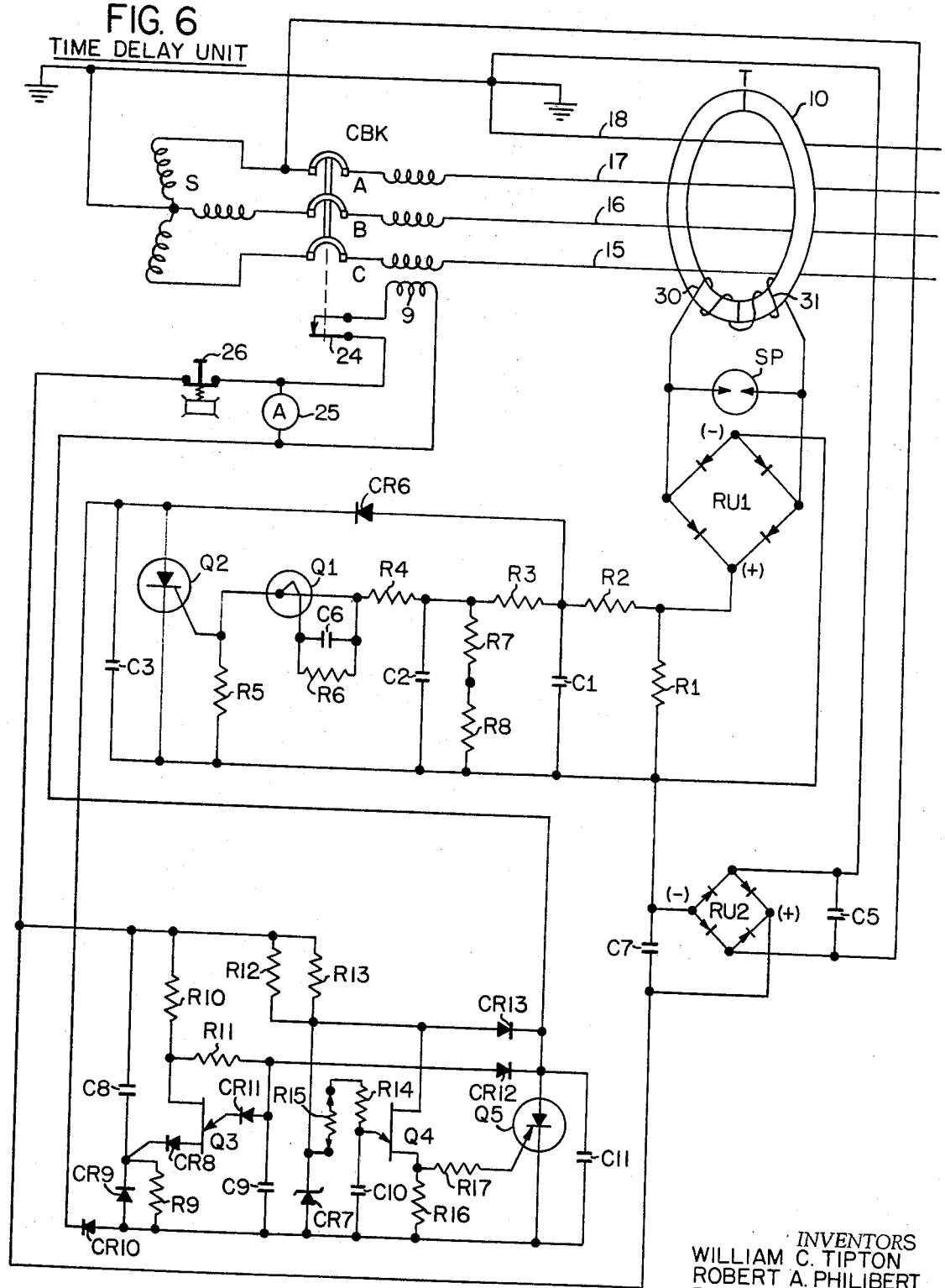
FIG. 6 shows a circuit diagram of a time delay unit organized to delay a fault detection response from causing an external control for a predetermined time.

With reference to FIG. 6, the same source S supplies energy through the circuit breaker CBK to the wires 15, 16, 17 and 18. The transformer T has its core 10 surrounding these conductors 15, 16, 17 and 18; but in this instance, the windings 30 and 31 are located on separate halves of the core 10 without the windings 32 and 33 shown in FIG. 5. The output of the windings 30 and 31 is supplied to the rectifier unit RU1 in the same way as described in connection with FIG. 5.

The input of the rectifier unit RU2 is connected to the neutral wire 18 and phase A on the sources S side of the circuit breaker, the same as shown in FIG. 2. The capacitor C5 is connected across these wires for the same reason as previously explained. Thus, the capacitor C7 is continuously charged with energy from the line wires in readiness for energization of the trip winding 9 of the circuit breaker CBK. Since the energy is continuously on the rectifier unit RU2, should a discharge occur and energize the trip winding 9, the circuit breaker CBK opens and simultaneously therewith opens contact 24 so as to remove the continuous energy from RU2 through the trip winding 9.

In addition, this continuous energy once initiated will continue to flow until stopped so that the energy which flows in this circuit through the alarm 25 must be interrupted in order to restore the apparatus to normal. For this purpose the manually, or automatically, operable contact 26 is provided.

In addition, the apparatus constituting the time-delay and reset unit involves the second silicon-controlled rectifier Q5 and a unijunction transistor Q4. Also, the apparatus includes the unijunction transistor Q3 with diodes CR8, CR9, CR10, CR11 and CR12. A Zener diode CR7 is also used in this organization. Capacitors C8, C9, C10 and C11 are likewise used. Resistors R9, R10, R11, R12, R13, R14, R15, R16 and R17 are used for reasons as presently to be described.

Let us consider the operation of the timer and reset unit. This operation proceeds only when the silicon-controlled rectifier Q2 has been triggered due to a fault current as described in connection with FIG. 5. However, the silicon-controlled rectifier Q2 receives its energy through a different path. More specifically, the current flows from the positive terminal of rectifier unit RU2, through resistor R10, the base of unijunction transistor Q3, diode CR8, resistor R9, diode CR10, silicon-controlled rectifier Q2 to the negative terminal of the rectifier unit RU2. The unijunction transistor Q3 in combination with its related circuitry repeatedly interrupts the current in the circuit just mentioned, so that if the ground fault signal is removed from silicon-controlled rectifier Q2 before the completion of the time delay period, this automatic high-speed electronic reset will cause Q2 to cease to conduct removing power from the input to the timing unit. This means that if the ground fault signal is removed from the input to the silicon-controlled rectifier Q2 before the completion of the time delay period, the timing operation ceases and the circuit breaker trip coil 9 is not energized.

If, however, the ground fault signal has persisted, the electronic timer will, after a period of delay, activate the second electronic silicon-controlled rectifier Q5 and cause the charge on capacitor C7 to discharge through the trip coil 9 from the positive terminal of rectifier of RU2 via closed contact 26, closed contact 24, winding 9, anode of silicon-controlled rectifier Q5, diode CR10, silicon-controlled rectifier Q2 to the negative terminal of capacitor C7 and rectifier unit RU2. The current in this circuit trips the circuit breaker CBK which in turn opens contact 24. The current still continues to actuate alarm 25 until the button 26 is operated to open the contact and de-energize both of the silicon-controlled rectifiers Q2 and Q5.

To return to the resetting operation, when the voltage is applied due to the conduction of Q2 to the resistor R10, the base of unijunction transistor Q3, and resistor R9, a voltage drop is placed across the capacitor C8 which charges. Also, a voltage is applied to C9 through resistors R10 and R11. When the capacitor C9 reaches a charged critical value, it applies voltage through diode CR11 to trip the unijunction transistor Q3. This causes the capacitor C8 and C9 to be connected in series and produces a voltage across them which is greater than the applied voltage. This momentarily interrupts the flow of current from RU2 through the silicon-controlled rectifier Q2. This slight interruption is, of course, only effective to restore Q2 to non-conductivity providing the fault has been removed or at least reduced below the critical value. The discharge of these capacitors C8 and C9 of course again renders the unijunction transistor Q3 non-conductive. The operation is then repeated very rapidly at a rate in the order of a thousand times a second.

The application of voltage from the positive terminal of rectifier unit RU2 to the upper terminals of resistors R12 and R13 supplies charging energy through resistors R15 and R14 to the capacitor C10. Capacitor C10 is of sufficient size to properly co-act with the resistors just mentioned to have an RC time constant of a value as desired for the timing unit. In this connection, the resistor R15 is initially selected and placed in position to give the desired timing operation. The Zener diode CR7 prevents undue voltages which might be supplied from the rectifier RU2 connections from being applied to the unijunction transistor Q4. When the capacitor C10 is charged to a critical value, it then causes the unijunction transistor Q4 to trigger and discharge the capacitor C10 through the resistor R16. This produces a voltage drop across R16 which is applied to the resistor R17 and causes the silicon-controlled rectifier Q5 to be triggered.

When Q5 conducts, positive energy then flows through it. This circuit can be traced from the positive terminal of the rectifier unit RU2 and capacitor C7 to contact 26, contact 24, trip winding 9, silicon-controlled rectifier Q5, diode CR10, silicon-controlled rectifier Q2, to the negative terminal of rectifier unit RU2 and capacitor C7. This causes the circuit breaker CBK to interrupt the current flow through the line wires 15, 16 and 17 thus removing the fault current. This means that upon the next operation of the reset device, energy is removed from Q2 to stop its conduction and the conduction of the silicon-controlled rectifier Q5. While the silicon-controlled rectifier Q5 is conducting, the diodes CR12 and CR13 bypass the circuits for unijunction transistors Q3 and Q4 so as to reduce the energy consumed thereby.

The capacitor C11 tends to shunt any high voltages which might be received from the line circuits and also absorbs any effects of the repetitional operation of the reset apparatus on such silicon-controlled rectifier.

In the above description of FIGS. 5 and 6, the diode CR6 is provided to shunt the trigger circuitry for the silicon-controlled rectifier Q2; but since the resistor R2 is included in series therewith, the current which actually flows through Q2 from CR6 is normally ineffective to continue conduction of silicon-controlled rectifier Q2. In other words, the current which may flow through diode CR6 is usually a lower value than that required to maintain conduction of the silicon-controlled rectifier Q2. However, if extreme fault currents should occur and the protective device SP is ineffective, the current which flows through CR6 might be sufficient to continue conduction of the silicon-controlled rectifier Q2. But the triggering of the circuit breaker CBK interrupts the fault current so that energy would be removed in any event from the tripping circuitry including diode CR6.

Also, the description of FIGS. 5 and 6 points out that the capacitor C7 is discharged to energize the trip coil 9. Such capacitor C7 is used so as to supply sufficient current with the applied voltage to actuate the trip coil 9 quickly; but this does not mean that the voltage and current supplied by the rectifier unit would fail to actuate the trip coil 9 in the event the capacitor C7 were not present. The capacitor C7 operates both as a filter and as a source of energy for the quick actuation of any devices connected thereto, and it is especially effective during fault conditions which might cause a low voltage in the source of supply. In brief, the rectifier voltage is in parallel with the capacitor C7, and operating energy can be received by the trip winding 9 from both sources; but it is assumed that the capacitor C7 would be initially at least partially discharged before the rectifier unit would take over and carry the load. This would cause the quick response of the trip coil 9.

It will be obvious to those skilled in the art that the self-powered unit shown in FIG. 5 can have its rectifier unit RU2 furnished with power as shown in FIG. 1 instead of using the windings 32 and 33. As thus modified, such FIG. 5 can then be substituted in FIG. 1 instead of FIG. 4.

It will also be obvious to those skilled in the art that the time delay unit of FIG. 6 can be removed, and the remaining apparatus can be substituted in FIG. 3 instead of FIG. 4.

Also, the apparatus of FIGS. 5 and 6 can each be used to detect a predetermined current in a single conductor of ground current, instead of using the zero sequencing of several conductors as shown in such FIGS. 5 and 6.

In any of the above described forms, the various parts can be encapsulated in an epoxy body of flameproof material as shown in FIGS. 2B, 2C, 2D and 2E. Such body includes the core 10 and other electronic parts shown in either FIG. 4, 5 or 6 as desired for the particular usage.

FIG. 2B shows a top view of FIG. 2C in which the split of the core and epoxy body is illustrated. In particular, the details are shown in FIG. 2D where the epoxy is removed from the front of core 10. Looking downwardly at one leg of the lower portion 41 of the detector unit in a view shown in FIG. 2E, the rectangular cross-section of the core 10 can be seen.

The upper portion 40 and lower portion 41 of the detector or sensor unit provides a composite body or unit. The core 10 is divided into two halves at the split. The separated parts slightly protrude into the split area. These parts are brought tightly together by causing portions 40 and 41 to be held together. The cores halves must evenly and exactly match. For this reason, suitable means must be used to make the holding pressure uniform. More specifically, four screws 42, 43, 44 and 45 are located as seen in FIG. 2B. The front screws 43 and 45 can be seen in FIG. 2C. Each of these screws has a coil spring underneath its head. Of these four springs only springs 47 and 49 can be seen in FIG. 2C.

When the portions 40 and 41 are placed in position to enclose one or more cables in the central opening, the screws 42, 43, 44 and 45 are each tightened until each associated spring is compressed and the screws are bottomed. Then each screw is turned counterclockwise for one-fourth turn. This causes the springs to supply a substantially uniform holding effect which levels the two parts of the core and provides a uniform pressure. All screws should be tightened evenly in rotation whereby one screw is not over-tightened and the others are loose.

In FIG. 2D, the core 10 can be seen in two halves with the lead wires from its two coils crossing the split by plug connectors 50 and 51. The two halves of each plug connector are embedded in opposite portions 40 and 41. Instead of using complete semicircular coils, any suitable number of small bobbins can be used and connected in series for FIG. 6 and divided between two coils for FIG. 5. In this last instance, four plug connectors would be required for the lead wires crossing the split. Regardless of whether complete semicircular coils or bobbins are used, the total number of turns for a setting between 20–30 amperes is in the order of six thousand. In any event, suitable leads are run from the coils to the electronic units which are located in the encapsulation generally in the area shown by the dotted rectangle 55. There are also lead wires (not shown) from this area 55 to the terminal posts 56. The cover plate 57 is held in place by screws 58. There is suitable space between the cover plate 57 and the terminals 56 to mount input and output wires.

The complete detector unit can be mounted in any suitable way so long as there is no pressure on the circumference of the large inner opening for receiving the cables. Also, no pressure should be allowed on either portion 40 or 41 of the body when the other portion is fastened down. Two groups of fastening or mounting holes are provided. More specifically, holes 59 and 60 are in portion 40 of the unit, and holes 61 and 62 are in portion 41 of the unit. Either holes 59 and 60 should be used for mounting; or holes 61 and 62 should be used. If both pairs of mounting holes are used, pressure may be placed differently on the two portions 40 and 41 of the unit which will tend to pull the core faces apart at the split and change the setting of the unit for proper response to fault load currents.

When the detector or sensor unit is used in the zero sequencing mode as above described, several conductors have to be enclosed in the central opening of the unit. All of such conductors (actually insulated cables) should be tightly bundled together before being enclosed within the detector unit, to avoid putting pressures on the inside of the core. Any such pressures will change the response setting of the unit.

While several forms have been described as being considered the preferred embodiments of the invention, it will be obvious to those skilled in the art that various changes and modifications may be made therein, without departing from the invention.

What is claimed is:

1. An electrical fault detector for alternating current circuits comprising in combination, a magnetic core means surrounding an electrical conductor capable of carrying a fault current, a winding on said core means responsive to magnetic flux therein for producing an output, said magnetic core means and said windings constituting a toroid type transformer, means for rectifying said output, circuit means responsive to said rectified output when it reaches a preselected voltage value for exercising a control indicative of a fault current, a surge protector connected across the terminals of said winding, said protector being normally nonconductive but becoming conductive and constituting a low impedance shunt when a voltage is induced in said winding of a value substantially above the value required for producing said preselected voltage across said circuit means.

2. A fault detector as set forth in claim 1 wherein said surge protector is of the gas-filled type.

3. A fault detector as set forth in claim 1 wherein said core means is laminated and is formed with two halves constituting a donut-shaped core with said winding mounted on both halves of said core, plug coupling means for connecting the windings mounted on two halves of said core, and means for holding said two halves together.

4. An electrical fault detector apparatus for alternating current circuits comprising a toroid transformer means surrounding an electrical conductor capable of carrying a fault current, the windings of said toroid transformer means providing an output proportional to the magnetic flux produced in its core by the presence of a fault current in said electrical conductor, a rectifying integrating circuit means connected to the output terminals of said toroid transformer and supplying output voltages above a preselected value upon the occurrence of a fault current above a preselected value, a silicon-controlled rectifier having its control electrode and cathode connected to receive the output of said rectifying integrating circuit means and effective to be tripped by said voltage when it rises to said preselected voltage value, an alternating current supply connected through a rectifier for supplying a direct current across the anode and cathode of said silicon controlled rectifier and through a fault-indicating device, and a bypass capacitor connected across said silicon-controlled rectifier between its anode and cathode to thereby allow any transient voltages received from said alternating current supply source to bypass said silicon-controlled rectifier.

5. An electrical fault detector apparatus for alternating current circuits comprising a toroid transformer surrounding an electrical conductor capable of carrying a fault current, two independent windings on said toroid transformer, each providing an output proportional to the magnetic flux produced in its core by the presence of a fault current in said electrical conductor, a rectifying integrating circuit means connected to the output terminals of the first of said toroid transformer windings for supplying output voltages at or above a preselected value upon the occurrence of a fault current in said electrical conductor at or above a preselected value, a silicon-controlled rectifier having its control electrode and cathode connected to receive the output of said rectifying integrating circuit means and effective to be tripped by said output when it rises to or above said preselected voltage value, a rectifier circuit means connected to the second winding of said toroid transformer for supplying a direct current across the anode and cathode of said silicon-controlled rectifier and through a winding of a fault indicating device, and a capacitor connected across the output of said rectifier circuit means to thereby charge during the presence of said fault current through said electrical conductor and effectively discharge when said silicon-controlled rectifier is tripped to activate said fault indicating device.

6. A fault detector as set forth in claim 5 wherein said fault indicating device is a circuit breaker in said electrical conductor which is rendered effective to open said conductor and remove said fault current when actuated by said capacitor across said rectifier.

7. A fault detector as set forth in claim 4 wherein a silicon unilateral switch is included in the connection between said output of said rectifying integrating circuit means and the control gate of said silicon controlled rectifier to thereby cause the abrupt tripping of said silicon controlled rectifier.

8. A fault detector as set forth in claim 4 wherein a diode is connected across a portion of said rectifying integrating circuit means to the anode of said silicon controlled rectifier whereby upon the tripping of said silicon controlled rectifier current flows through said silicon controlled rectifier bypassing the circuit means supplying control voltage to its control gate.

9. An electrical fault detector for alternating current circuits comprising in combination, a magnetic core means surrounding an electrical conductor capable of carrying a fault current, a winding on said core means responsive to magnetic flux therein for producing an output, means for rectifying said output, circuit means responsive to said rectified output when the voltage induced in said winding reaches a preselected value as a result of a fault current, said circuit means being effective to produce a control indicative of a fault current as a result of said fault current rising above said preselected voltage in said winding, said magnetic core means becoming saturated with magnetic flux when said fault current rises to a value substantially above that required to produce said preselected voltage in said coil, a gas filled protector connected across the terminals of said winding, said protector being normally nonconductive but becoming conductive and constituting a low impedance shunt when voltages are induced in said winding of a value substantially above said preselected value, whereby any short pulses of high voltages produced as a result of said core means becoming saturated are caused to be shunted by said surge protector to thereby protect said rectifying means and said circuit means from such high voltage pulses.

10. An electrical fault detector as set forth in claim 9, wherein a capacitor is connected across said alternating current supply just preceding its rectifying means to absorb any high voltage short extraneous pulses appearing therein.

11. An electrical fault detector apparatus for alternating current circuits, an electrical conductor capable of carrying a fault current, a silicon-controlled rectifier having a control electrode and a cathode, circuit means effective to supply a tripping voltage to said control electrode when there is a presence of a fault current in said electrical conductor, a second silicon-controlled rectifier having a controlled electrode and a cathode, circuit means governed by said first silicon-controlled rectifier for supplying a tripping voltage to said control electrode of said second silicon-controlled rectifier a predetermined time after said first silicon-controlled rectifier becomes conductive, and circuit means controlled by said second silicon-controlled rectifier upon becoming conductive for discharging a capacitor supplied with direct current from a suitable source through a circuit breaker trip mechanism.

12. A fault detector as set forth in claim 11 wherein said power supply is independent of said conductor supplied with energy through said circuit breaker.

13. An electrical fault detector for alternating current circuits comprising a magnetic core structure for surrounding a plurality of insulated electrical cables, said core structure being divided into two parts for ready placement, a pressure equalizing means for holding said parts together, windings on both parts of said core structure, plug connectors for connecting the windings of both parts, and means connected to said windings for effecting a control indicative of a fault current when the voltage in said windings rises above a preselected value.

14. A fault detector as set forth in claim 13 wherein said pressure equalizing means is a set of springs tensioned by their respective screws.

15. A fault detector as set forth in claim 13 wherein said windings on both parts are a plurality of bobbins distributed equally around said core and connected in series to form a complete winding for said fault detector core structure.

16. A fault detector as set forth in claim 13 wherein said plug connectors each have two parts respectively mounted adjacent said two parts of said core structure to thereby make contact when said pressure equalizing means is rendered effective to hold said two parts of said core structure together.

17. A fault detector as set forth in claim 13 wherein said control means is effective to trip a circuit breaker supplying power to said electrical cables.

References Cited

UNITED STATES PATENTS

| | | | |
|---|---|---|---|
| 2,677,077 | 4/1954 | Knudson | 336—175 X |
| 3,187,225 | 6/1965 | Mayer | 317—33 X |
| 3,249,813 | 5/1966 | Price et al. | 317—12 |
| 3,259,802 | 7/1966 | Steen | 317—33 X |
| 3,353,066 | 11/1967 | De Souza | 317—31 |

JAMES D. TRAMMELL, Primary Examiner

U.S. Cl. X.R.

317—27, 31, 33, 49, 151; 336—175